(12) United States Patent
Kobayashi et al.

(10) Patent No.: US 7,592,280 B2
(45) Date of Patent: Sep. 22, 2009

(54) ALUMINUM NITRIDE SINTERED BODY, METHOD OF MANUFACTURING ALUMINUM NITRIDE SINTERED BODY, AND MEMBER

(75) Inventors: Yoshimasa Kobayashi, Nagoya (JP); Naohito Yamada, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 138 days.

(21) Appl. No.: 11/685,945

(22) Filed: Mar. 14, 2007

(65) Prior Publication Data

US 2007/0225152 A1 Sep. 27, 2007

(30) Foreign Application Priority Data

Mar. 22, 2006 (JP) ............................. 2006-078689

(51) Int. Cl.
*C04B 35/581* (2006.01)
(52) U.S. Cl. ..................................... 501/98.4; 501/98.5
(58) Field of Classification Search ................ 501/98.4, 501/98.5
See application file for complete search history.

(56) References Cited

U.S. PATENT DOCUMENTS

| | | | | |
|---|---|---|---|---|
| 5,767,028 A | * | 6/1998 | Komatsu et al. | 501/98.5 |
| 7,288,496 B2 | * | 10/2007 | Kobayashi et al. | 501/98.4 |
| 7,422,992 B2 | * | 9/2008 | Teratani et al. | 501/98.5 |
| 2005/0013761 A1 | | 1/2005 | Kobayashi et al. | |
| 2006/0217259 A1 | * | 9/2006 | Teratani et al. | 501/98.5 |

FOREIGN PATENT DOCUMENTS

JP 2005-029458 A1 2/2005

* cited by examiner

*Primary Examiner*—Karl E Group
(74) *Attorney, Agent, or Firm*—Burr & Brown

(57) ABSTRACT

An aluminum nitride sintered body is provided, wherein an average crystal grain diameter is 2.0 μm or less, a crystalline phase detected by an X-ray diffractometer is an AlN phase only or an AlN phase and an AlON phase only, and $SiO_2$ or MgO is present in an amount of more than 0.05 wt % to less than 1 wt %.

5 Claims, 1 Drawing Sheet

ALUMINUM NITRIDE SINTERED BODY, METHOD OF MANUFACTURING ALUMINUM NITRIDE SINTERED BODY, AND MEMBER

CROSS REFERENCE TO RELATED APPLICATION

This application is based upon and claims the benefit of priority from a Japanese Patent Application No. TOKUGAN 2006-078689, filed on Mar. 22, 2006; the entire contents of which are incorporated herein by reference.

BACKGROUND OF THE INVENTION

1. Field of the Invention

The present invention relates to an aluminum nitride sintered body and a method of manufacturing the same.

2. Description of the Related Art

As is conventionally known, when an aluminum nitride sintered body is polished, a degree of flatness in the order of several tens of nanometers is difficult to obtain. The present inventors thought that the flatness was difficult to obtain because aluminum nitride grains fall off during polishing. As a result of intensive researches, as disclosed in Japanese Patent Application Laid-open No. 2005-029458, they have found that fall-off of aluminum nitride grains can be suppressed by increasing the strength of a grain boundary and reducing the diameter of the aluminum nitride grains. In addition, the inventors have found that the strength of the grain boundary can be improved by adding $SiO_2$ to an aluminum nitride sintered body, as disclosed in Japanese Patent Application Laid-Open No. 2005-029458.

However, when $SiO_2$ was added to an aluminum nitride sintered body, the diameters of aluminum nitride grains are likely to increase. Therefore, improvements of grain-boundary strength and reduction of aluminum nitride grains in size are not achieved at the same time. Furthermore, when an amount of an sintering additives such as $SiO_2$ is large, a grain boundary phase is generated. Since aluminum nitride grains and the grain boundary phase are ground at different rates, dimples are formed at the grain boundary phase. For this reason, the flatness could not be improved. Under these technical circumstances, it has been desired to provide an aluminum nitride sintered body excellent in flatness, that is, having a degree of flatness in the order of several tens of nanometers, by polishing.

The present invention has been achieved in order to solve the aforementioned problem, and an object of the invention is to provide an aluminum nitride sintered body excellent in flatness by polishing, a method of manufacturing the aluminum nitride sintered body, and a member.

SUMMARY OF THE INVENTION

The present inventors considered that the flatness of an aluminum nitride sintered body by polishing can be improved by enhancing the strength of the grain boundary, reducing aluminum nitride grains in size, and reducing the grain boundary phase. As the result of intensive researches, the inventors have found that an aluminum nitride sintered body excellent in flatness by polishing can be provided by enhancing the strength of the grain boundary; at the same time, by adding $SiO_2$ (silicon dioxide) or MgO (magnesium oxide), which forms a solid solution with aluminum nitride during a sintering process, with the result that it is no longer present as a grain boundary phase, in a small amount to an aluminum nitride powder, followed by sintering the aluminum nitride powder at a low temperature from more than 1600° C. to less than 1750° C.

A feature of an aluminum nitride sintered body according to a first aspect of the present invention obtained from these findings resides in that a crystal grain diameter is 2.0 μm or less, the crystalline phase detected by an X-ray diffractometer is an AlN phase only or an AlN phase and an AlON phase only, and $SiO_2$ or MgO is contained in an amount of more than 0.05 wt % to less than 1 wt %. Furthermore, a feature of an aluminum nitride sintered body according to a second aspect of the present invention resides in that a surface roughness is 100 nm or less (in this specification, the term "surface roughness" refers to a maximum height Rt of a section thereof).

Note that the aluminum nitride sintered body is desirably produced by sintering an aluminum nitride powder in the temperature range of more than 1600° C. to less than 1750° C. The average crystal grain diameter of the aluminum nitride powder is desirably 2.0 μm or less and more preferably within the range of 0.5 μm to 1.0 μm. Furthermore, at least one part of a member for a semiconductor manufacturing device such as an electrostatic chuck and a mold for forming a precision member or the like can be formed of the aluminum nitride sintered body.

BRIEF DESCRIPTION OF THE DRAWING

Exemplary embodiments of the invention will become more fully apparent from the following description and appended claims, taken in conjunction with the accompanying drawing. Understanding that this drawing depicts only exemplary embodiments and is, therefore, not to be considered limiting of the invention's scope, the exemplary embodiments of the invention will be described with additional specificity and detail through use of the accompanying drawing in which:

DETAILED DESCRIPTION OF THE INVENTION

Figure 1:
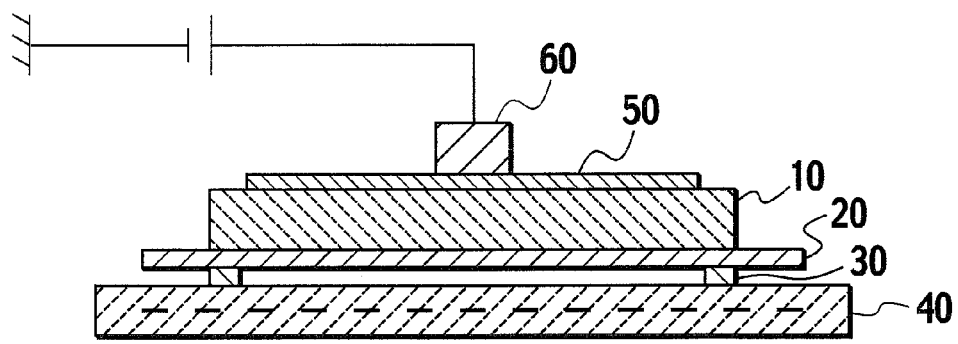
FIG. 1 is a schematic diagram showing a structure of a measurement apparatus for evaluating a fall-off property of particles.

Embodiments of a method of manufacturing an aluminum nitride sintered body according to the present invention will be explained below.

EXAMPLE 1

In Example 1, first, to 100 parts by weight of an aluminum nitride powder having an average particle diameter of 0.7 μm, 0.5 parts by weight of MgO was added and mixed by a pot mill or a ball mill to prepare a powder mixture according to Example 1. Note that mixing can be performed in either a wet or dry state. When mixing is performed in a wet state, a dry process is performed after mixing to prepare a powder mixture. After the preparation of the powder mixture was completed, the powder mixture was granulated directly as it was or after adding a binder and formed to obtain a disk-shaped product. A forming method is not particularly limited and various methods including die pressing, CIP (Cold Isostatic Pressing) and slip casting can be used. The formed product was then sintered at 1650° C. for 4 hours by a hot press process or a sintering process under normal pressure to obtain an aluminum nitride sintered body according to Example 1. When the average diameter of the aluminum nitride grains in the aluminum nitride sintered body of Example 1 was determined, it was 0.7 μm. Furthermore, when the crystal phase of the aluminum nitride sintered body of Example 1 was determined by an x-ray diffractometer, the aluminum nitride sintered body was constituted of an AlN phase and an AlON phase.

EXAMPLE 2

In Example 2, first, to 100 parts by weight of an aluminum nitride powder having an average particle diameter of 0.7 (μm), 0.1 part by weight of $SiO_2$ was added and mixed by a pot mill or a ball mill to prepare a powder mixture according to Example 2. Thereafter, the same process as in Example 1 was performed to obtain an aluminum nitride sintered body according to Example 2. When the average diameter of the aluminum nitride grains in the aluminum nitride sintered body of Example 2 was determined, it was 1.0 μm. Furthermore, when the crystal phase of the aluminum nitride sintered body of Example 2 was determined by an X-ray diffractometer, the aluminum nitride sintered body was constituted of an AlN phase and an AlON phase.

EXAMPLE 3

In Example 3, first, to 100 parts by weight of an aluminum nitride powder having an average particle diameter of 0.7 (μm), 0.5 part by weight of $SiO_2$ was added and mixed by a pot mill or a ball mill to prepare a powder mixture according to Example 3. Thereafter, the same process as in Example 1 was performed to obtain an aluminum nitride sintered body according to Example 3. When the average diameter of the aluminum nitride grains in the aluminum nitride sintered body of Example 3 was determined, it was 0.7 μm. Furthermore, when the crystal phase of the aluminum nitride sintered body of Example 3 was determined by an X-ray diffractometer, the aluminum nitride sintered body was constituted of an AlN phase and an AlON phase.

EXAMPLE 4

In Example 4, the same process as in Example 1 was performed except that a sintering temperature was changed from 1650° C. to 1700° C. to obtain an aluminum nitride sintered body according to Example 4. When the average diameter of the aluminum nitride grains in the aluminum nitride sintered body of Example 4 was determined, it was 1.2 μm. Furthermore, when the crystal phase of the aluminum nitride sintered body of Example 4 was determined by an X-ray diffractometer, the aluminum nitride sintered body was constituted of an AlN phase and an AlON phase.

EXAMPLE 5

In Example 5, the same process as in Example 2 was performed except that a sintering temperature was changed from 1650° C. to 1700° C. to obtain an aluminum nitride sintered body according to Example 5. When the average diameter of the aluminum nitride grains in the aluminum nitride sintered body of Example 5 was determined, it was 1.4 μm. Furthermore, when the crystal phase of the aluminum nitride sintered body of Example 5 was determined by an X-ray diffractometer, the aluminum nitride sintered body was constituted of an AlN phase and an AlON phase.

EXAMPLE 6

In Example 6, the same process as in Example 3 was performed except that a sintering temperature was changed from 1650° C. to 1700° C. to obtain an aluminum nitride sintered body according to Example 6. When the average diameter of the aluminum nitride grains in the aluminum nitride sintered body of Example 6 was determined, it was 1.4 μm. Furthermore, when the crystal phase of the aluminum nitride sintered body of Example 6 was determined by an X-ray diffractometer, the aluminum nitride sintered body was constituted of an AlN phase and an AlON phase.

COMPARATIVE EXAMPLE 1

In Comparative Example 1, an aluminum nitride powder was granulated directly as it was or after adding a binder and formed into a disk-shaped product. The formed product was sintered at 1700° C. for 4 hours by a hot press process or a sintering process under normal pressure to obtain an aluminum nitride sintered body according to Comparative Example 1. When the average diameter of the aluminum nitride grains in the aluminum nitride sintered body of Comparative Example 1 was determined, it was 1.1 μm. Furthermore, when the crystal phase of the aluminum nitride sintered body of Comparative Example 1 was determined by an X-ray diffractometer, the aluminum nitride sintered body was constituted of an AlN phase and an AlON phase.

COMPARATIVE EXAMPLE 2

In Comparative Example 2, first, to 100 parts by weight of an aluminum nitride powder having an average particle diameter of 0.7 μm, 0.5 μparts by weight of $Y_2O_3$ was added and mixed by a pot mill or a ball mill to prepare a powder mixture according to Comparative Example 2. Thereafter, the same process as in Example 1 was performed to obtain an aluminum nitride sintered body according to Comparative Example 2. When the average diameter of the aluminum nitride grains in the aluminum nitride sintered body of Comparative Example 2 was determined, it was 1.6 μm. Furthermore, when the crystal phase of the aluminum nitride sintered body of Comparative Example 2 was determined by an X-ray diffractometer, the aluminum nitride sintered body was constituted of an AlN phase, an AlON phase, and a YAG ($Y_3Al_5O_{12}$) phase.

COMPARATIVE EXAMPLE 3

In Comparative Example 3, the same process as in Comparative Example 2 was performed except that a sintering temperature was changed from 1650° C. to 1700° C. to obtain an aluminum nitride sintered body according to Comparative Example 3. When the average diameter of the aluminum nitride grains in the aluminum nitride sintered body of Comparative Example 3 was determined, it was 2.2 μm. Furthermore, when the crystal phase of the aluminum nitride sintered body of Comparative Example 3 was determined by an X-ray diffractometer, the aluminum nitride sintered body was constituted of an AlN phase, an AlON phase, and a YAG phase.

COMPARATIVE EXAMPLE 4

In Comparative Example 4, first, to 100 parts by weight of an aluminum nitride powder having an average particle diameter of 0.7 μm, 2.0 parts by weight of $SiO_2$ was added and mixed by a pot mill or a ball mill to prepare a powder mixture according to Comparative Example 4. Thereafter, the same process as in Comparative Example 3 was performed to obtain an aluminum nitride sintered body according to Comparative Example 4. When the average diameter of the aluminum nitride grains in the aluminum nitride sintered body of Comparative Example 4 was determined, it was 1.0 μm. Furthermore, when the crystal phase of the aluminum nitride sintered body of Comparative Example 4 was determined by an X-ray diffractometer, the aluminum nitride sintered body was constituted of an AlN phase and an $SiAl_7O_2N_7$ phase.

COMPARATIVE EXAMPLE 5

In Comparative Example 5, first, to 100 parts by weight of an aluminum nitride powder having an average particle diameter of 0.7 μm, 5.0 parts by weight of $Y_2O_3$ was added and mixed by a pot mill or a ball mill to prepare a powder mixture according to Comparative Example 5. Thereafter, the same process as in Comparative Example 3 was performed to obtain an aluminum nitride sintered body according to Comparative Example 5. When the average diameter of the aluminum nitride grains in the aluminum nitride sintered body of Comparative Example 5 was determined, it was 4.0 μm. Furthermore, when the crystal phase of the aluminum nitride sintered body of Comparative Example 5 was determined by an X-ray diffractometer, the aluminum nitride sintered body was constituted of an AlN phase, a YAL ($YAlO_3$) phase, and a YAM($Y_4Al_2O_9$) phase.

[Evaluation Method]

The flatness of each of the aluminum nitride sintered bodies of Examples and Comparative Examples by polishing was evaluated by counting the number of fallen off particles by polishing (count/mm$^2$), the surface roughness (Rt,nm), and the number of particles (count) per 50 mm$^2$. Note that the number of fallen off particles by polishing (count/mm$^2$), the surface roughness (Rt, nm), and the number of particles (count) per 50 mm$^2$ were determined by the methods described below.

[Method of Counting the Number of Fallen Off Particles by Polishing]

One of the surfaces of each of the aluminum nitride sintered bodies according to Examples and Comparative Examples was polished by a diamond (#400) grindstone, followed by a copper rubbing machine on which slurry containing diamond grains having 9 μm and 3 μm in diameter was dropped. The number of fallen off aluminum nitride particles from the polishing surface was counted by observing two points (an area of 4 mm$^2$) of the center and edge portion of the polished surface under an SEM. The count of the particles thus obtained was divided by 4 mm$^2$ to calculate the number of particles by polishing.

[Method of Measuring Surface Roughness]

One of the surfaces of each of the aluminum nitride sintered bodies according to Examples and Comparative Examples was polished by a diamond (#400) grindstone, followed by a copper rubbing machine on which slurry containing diamond grains having 9 μm and 3 μm in diameter was dropped, and then, by a buffing machine on which slurry containing diamond grains of 1 μm in diameter was dropped for 270 minutes. Thereafter, the surface roughness was determined.

[Method of Measuring the Number of Particles]

The number of particles was counted by adsorbing an Si wafer using an aluminum nitride sintered body of each of Examples and Comparative Examples as an electrostatic chuck and counting the number of fallen off aluminum nitride particles on the Si wafer. More specifically, in a closable chamber for a measurement test, a plate-type ceramic heater 40 for controlling the temperature as shown in FIG. 1 was arranged. On the heater 40, an Si wafer 20 was set with a spacer 30 interposed between them. On the other hand, on the rear surface of an electrostatic chuck 10 formed of an aluminum nitride sintered body according to Examples and Comparative Examples, an adsorption application electrode composed of conductive paste 50 was formed. The electrostatic chuck 10 was placed on the Si wafer 20 with the adsorption surface faced down. The evacuation of the chamber was then started at a room temperature and the electrostatic chuck 10 was gradually heated by use of the ceramic heater 40 and increased to a temperature of 400° C. in vacuum. Next, the Si wafer 20 was adsorbed to the adsorption surface of the electrostatic chuck 10 under the conditions: 400° C. and an adsorption voltage of 250 V, for 1 min. Thereafter, the temperature of the electrostatic check 10 was decreased to a room temperature and the pressure of the chamber was returned to the atmospheric pressure. After the electrostatic chuck 10 was removed, the number of fallen off aluminum nitride particles on the Si wafer was counted. Whether the particles were aluminum nitride particles was determined by subjecting all particles to EDS analysis. The number of aluminum nitride particles per 50 mm$^2$ was counted by observing two points (an area of 4 mm$^2$) of the center and edge portion of the Si wafer 20 under an SEM. The particle count per 50 mm$^2$ was calculated based on the observation results.

[Evaluation Results]

With respect to each of the aluminum nitride sintered bodies of Examples and Comparative Examples, the number of fallen off particles by polishing and the number of particles per 50 mm$^2$ were measured. The results are shown in Table 1.

TABLE 1

| | COMPOSITION | GRAIN DIAMETER OF RAW MATERIAL (μm) | SINTERING TEMPERATURE (° C.) | SINTERING TIME (h) | PARTICLE DIAMETER (μm) | CONSTITUTIONAL PHASE | NUMBER OF FALLEN OFF PARTICLES BY POLISHING (NUMBER/mm$^2$) | SURFACE ROUGHNESS (Rt, nm) | NUMBER OF PARTICLES PER 50 mm$^2$ (NUMBER) |
|---|---|---|---|---|---|---|---|---|---|
| EXAMPLE 1 | 0.5 wt % MgO | 0.7 | 1650 | 4 | 0.7 | AlN, AlON | 44 | 90 | 14 |
| EXAMPLE 2 | 0.1 wt % SiO2 | 0.7 | 1650 | 4 | 1.0 | AlN, AlON | 40 | 78 | 22 |

TABLE 1-continued

| | COMPOSITION | GRAIN DIAMETER OF RAW MATERIAL (μm) | SINTERING TEMPERATURE (° C.) | SINTERING TIME (h) | PARTICLE DIAMETER (μm) | CONSTITUTIONAL PHASE | NUMBER OF FALLEN OFF PARTICLES BY POLISHING (NUMBER/mm²) | SURFACE ROUGHNESS (Rt, nm) | NUMBER OF PARTICLES PER 50 mm² (NUMBER) |
|---|---|---|---|---|---|---|---|---|---|
| EXAMPLE 3 | 0.5 wt % SiO2 | 0.7 | 1650 | 4 | 0.7 | AlN, AlON | 44 | 56 | 12 |
| EXAMPLE 4 | 0.5 wt % MgO | 0.7 | 1700 | 4 | 1.2 | AlN, AlON | 52 | 99 | NOT MEASURED |
| EXAMPLE 5 | 0.1 wt % SiO2 | 0.7 | 1700 | 4 | 1.4 | AlN, AlON | 60 | 82 | NOT MEASURED |
| EXAMPLE 6 | 0.5 wt % SiO2 | 0.7 | 1700 | 4 | 0.8 | AlN, AlON | 68 | 69 | 20 |
| COMPARATIVE EXAMPLE 1 | — | 0.7 | 1700 | 4 | 1.1 | AlN, AlON | 412 | 123 | NOT MEASURED |
| COMPARATIVE EXAMPLE 2 | 0.5 wt % Y2O3 | 0.7 | 1650 | 4 | 1.6 | AlN, AlON, YAG | 994 | 161 | NOT MEASURED |
| COMPARATIVE EXAMPLE 3 | 0.5 wt % Y2O3 | 0.7 | 1700 | 4 | 2.2 | AlN, AlON, YAG | 2624 | 223 | NOT MEASURED |
| COMPARATIVE EXAMPLE 4 | 2 wt % SiO2 | 0.7 | 1700 | 4 | 1.0 | AlN, SiAl7O2N7 | 1632 | 287 | 124 |
| COMPARATIVE EXAMPLE 5 | 5 wt % Y2O3 | 1.4 | 1800 | 4 | 4.0 | AlN, YAL, YAM | 1888 | 683 | 320 |

When the aluminum nitride sintered bodies of Examples 1 to 6 are compared to those of Comparative Examples 2, 3, and 5, the number of fallen off particles by polishing and the number of particles are smaller in the aluminum nitride sintered bodies of Examples 1 to 6 than those of Comparative Examples 2, 3, and 5. Furthermore, when the aluminum nitride sintered bodies of Examples 1 to 6 are compared to those of Comparative Examples 1 to 5, it is apparent that the surface roughness values of those of Comparative Examples 1 to 5 are larger than those of Examples 1 to 6. From this arrangement, it is found that an aluminum nitride sintered body having no grain boundary phase, which is processed at a different rate from aluminum nitride grains and suppressed in fallen off aluminum nitride particles during polishing and improved in flatness by polishing the aluminum nitride sintered body, can be obtained by constituting the aluminum sintered body of an AlN phase and AlON phase only.

When aluminum nitride sintered bodies of Examples 1 to 6, are compared to those of Comparative Examples 1 to 3 and 5, it is apparent that the number of fallen off particles by polishing and the number of particles in the aluminum nitride sintered bodies of Examples 1 to 6 are smaller than in those of Comparative Examples 1 to 3 and 5. From this arrangement, it is found that the strength of grain boundary is improved, falling-off of aluminum nitride particles during polishing can be suppressed, and the flatness of the aluminum sintered body by polishing can be improved by adding $SiO_2$ or MgO.

Furthermore, when aluminum nitride sintered bodies of Examples 5 and 6 are compared to that of Comparative Examples 4, it is apparent that the number of fallen off particles by polishing and the number of particles are smaller in the aluminum nitride sintered bodies of Examples 5 and 6 than in that of Comparative Example 4. From this arrangement, it is found that the falling-off of aluminum nitride particles during polishing can be suppressed in the case where the addition amount of $SiO_2$ is small. The reason why the aluminum nitride sintered bodies in Examples 1 to 6 have a smaller number of particles can be conceived that, since the surface roughness is as small as 100 nm or less, bumps of particles do not become stuck to an Si wafer, and accordingly particles do not drop out.

The present invention is not limited to the description and the drawings which constitute a part of the disclosure of the present invention according to the embodiment. Specifically, it may be added that, needless to say, other embodiments, examples, operational technologies and the like, which are made by those skilled in the art based on the embodiment, are all included in the scope of the present invention.

What is claimed is:

1. An aluminum nitride sintered body, wherein an average crystal grain diameter is 2.0 μm or less, a crystalline phase detected by an X-ray diffractometer is an AlN phase only or an AlN phase and an AlON phase only, and $SiO_2$ or MgO is contained in an amount of more than 0.05 wt % to less than 1 wt %.

2. The method of manufacturing the aluminum nitride sintered body according to claim 1, wherein the aluminum nitride sintered body is manufactured by sintering an aluminum nitride powder in a temperature range of more than 1600° C. to less than 1750° C.

3. The method of manufacturing the aluminum nitride sintered body according to claim 2, wherein an average crystal grain diameter of the aluminum nitride powder is within a range of 0.5 μm to 1.0 μm.

4. A member wherein at least one part of the member is formed of the aluminum nitride sintered body according to claim 1.

5. A member wherein at least one part of the member is formed of the aluminum nitride sintered body having a smooth surface of a surface roughness of 100 nm or less.

* * * * *